United States Patent
Li et al.

(10) Patent No.: US 11,929,492 B2
(45) Date of Patent: Mar. 12, 2024

(54) LITHIUM-ION SECONDARY BATTERY AND RELATED PREPARATION METHOD THEREOF, BATTERY MODULE, BATTERY PACK AND APPARATUS

(71) Applicant: Contemporary Amperex Technology Co., Limited, Ningde (CN)

(72) Inventors: Zhiqiang Li, Ningde (CN); Qifeng Li, Ningde (CN); Changlong Han, Ningde (CN)

(73) Assignee: Contemporary Amperex Technology Co., Limited, Ningde (CN)

(*) Notice: Subject to any disclaimer, the term of this patent is extended or adjusted under 35 U.S.C. 154(b) by 9 days.

(21) Appl. No.: 17/566,698

(22) Filed: Dec. 31, 2021

(65) Prior Publication Data
US 2022/0123286 A1  Apr. 21, 2022

Related U.S. Application Data

(63) Continuation of application No. PCT/CN2020/099734, filed on Jul. 1, 2020.

(30) Foreign Application Priority Data

Jul. 10, 2019 (CN) .......................... 201910618721.1

(51) Int. Cl.
*H01M 4/36* (2006.01)
*H01M 4/04* (2006.01)
*H01M 4/505* (2010.01)
*H01M 4/525* (2010.01)
*H01M 4/02* (2006.01)

(52) U.S. Cl.
CPC ......... *H01M 4/366* (2013.01); *H01M 4/0404* (2013.01); *H01M 4/505* (2013.01); *H01M 4/525* (2013.01); *H01M 2004/021* (2013.01); *H01M 2004/028* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 2013/0177812 A1* | 7/2013 | Han | H01M 4/525 252/520.5 |
| 2019/0013545 A1 | 1/2019 | Kim et al. | |
| 2019/0036154 A1* | 1/2019 | Kim | H01M 4/525 |
| 2020/0194781 A1* | 6/2020 | Tabushi | H01M 4/505 |

FOREIGN PATENT DOCUMENTS

| | | |
|---|---|---|
| CN | 1653641 A | 8/2005 |
| CN | 102792491 A | 11/2012 |
| CN | 105098139 A | 11/2015 |
| CN | 105098193 A | 11/2015 |
| CN | 106663774 A | 5/2017 |
| CN | 108475772 A | 8/2018 |
| CN | 108604674 A | 9/2018 |
| JP | 2018185883 A | 11/2018 |
| WO | 2019123932 A1 | 6/2019 |

OTHER PUBLICATIONS

T. Richard Jow, Kang Xu, Oleg Borodin, Makoto Ue, Editors. Electrolytes for Lithium and Lithium-Ion Batteries, Modern Aspects of Electrochemistry 58, 2004.*
The International search report for PCT Application No. PCT/CN2020/099734, dated Sep. 30, 2020, 19 pages.
The First Office Action for China Application No. 201910618721.1, dated Jun. 4, 2021, 15 pages.
The extended European search report for EP Application No. 20836780.5, dated Jul. 8, 2022, 6 pages.

* cited by examiner

*Primary Examiner* — Carlos Barcena
(74) *Attorney, Agent, or Firm* — East IP P.C.

(57) ABSTRACT

A lithium-ion secondary battery and related preparation method thereof, battery module, battery pack and apparatus. The lithium-ion secondary battery includes a positive electrode plate, a negative electrode plate, an electrolyte and a separator, wherein the positive electrode plate includes a positive electrode current collector and a first positive electrode active material layer and a second positive electrode active material layer sequentially disposed on at least one side of the positive electrode current collector; the lithium-ion secondary battery satisfies: $-1 \leq \log_{10}(u/v) \times w \leq 15.5$, wherein, u is a thickness of the first positive electrode active material layer in microns, v is a thickness of the second positive electrode active material layer in microns, w is a conductivity of the electrolyte at a temperature of 25° C. in $mS \cdot cm^{-1}$. The lithium-ion secondary battery has excellent performance such as low discharge resistance at low SOC and low gas production at high temperature.

15 Claims, No Drawings

LITHIUM-ION SECONDARY BATTERY AND RELATED PREPARATION METHOD THEREOF, BATTERY MODULE, BATTERY PACK AND APPARATUS

CROSS-REFERENCE TO RELATED APPLICATION

This application is a continuation of International Application No. PCT/CN2020/099734, filed on Jul. 1, 2020, which claims priority to Chinese Patent Application No. 201910618721.1 entitled "Lithium-ion secondary battery and preparation method thereof" and filed on Jul. 10, 2019, both of which are incorporated herein by reference in their entireties.

TECHNICAL FIELD

This application belongs to the field of electrochemical technology. More specifically, this application relates to a lithium-ion secondary battery and related preparation method thereof, battery module, battery pack and apparatus.

BACKGROUND

Lithium-ion secondary batteries are widely used in electric vehicles and consumer products because of their high-voltage plateau, high energy density, high output power, no memory effect, long cycle life and low environmental pollution. However, in conventional lithium-ion secondary batteries, the positive electrode active material has a long discharge curve and a large slope at a low state of charge (SOC), resulting in excessive large discharge resistance at low SOC, especially at low temperature and low SOC.

Moreover, when a fully charged battery is used or stored at a high temperature, the reactivity of the positive and negative electrodes with the electrolyte is enhanced, so the heat released by reactions is greatly increased and a large amount of gases are generated, resulting in expanded volume of the battery, and in some severe cases, possibly resulting in short circuit in the battery.

SUMMARY

In view of this, it is indeed necessary to provide a lithium-ion secondary battery with a low discharge resistance at low SOC, and preferably further with improved high-temperature gas generation performance.

An object of the present application is to provide a lithium-ion secondary battery with low discharge resistance at low SOC, especially at low temperature and low SOC.

A further object of the present application is to provide a lithium-ion secondary battery with low discharge resistance at low SOC and meanwhile having characteristics such as little high-temperature gas production.

To achieve the above objects, a first aspect of the present application provides a lithium-ion secondary battery, comprising a positive electrode plate, a negative electrode plate, an electrolyte, and a separator, wherein the positive electrode plate includes a positive electrode current collector and a first positive electrode active material layer and a second positive electrode active material layer sequentially disposed on at least one side of the positive electrode current collector; the lithium-ion secondary battery satisfies formula (I):

$$-1 \leq \log_{10}(u/v) \times w \leq 15.5 \qquad \text{formula (I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$.

A second aspect of the present application provides a method for preparing a lithium-ion secondary battery, at least including the following steps:

S1, applying a positive electrode slurry including a first positive electrode active material, a conductive agent and a binder on at least one surface of a positive electrode current collector, to form a first positive electrode active material layer;

S2, applying a positive electrode slurry containing a second positive electrode active material, a conductive agent and the binder on the first positive electrode active material layer, to form a second positive electrode active material layer;

S3, drying to obtain a positive electrode plate including the positive electrode current collector and the first positive electrode active material layer and the second positive electrode active material layer sequentially disposed on at least one side of the positive electrode current collector;

S4, sequentially laminating the positive electrode plate, a separator and a negative electrode plate and then winding or pressing to obtain an electrode assembly, then injecting an electrolyte, and packaging, to obtain a secondary battery;

wherein, the secondary battery satisfies formula (I):

$$-1 \leq \log_{10}(u/v) \times w \leq 15.5 \qquad \text{formula (I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$.

A third aspect of the present application provides a battery module, including the lithium-ion secondary battery as described herein.

A fourth aspect of the present application provides a battery pack, including the battery module described herein.

A fifth aspect of the present application provides an apparatus, including the lithium-ion secondary battery as described herein.

Compared with the prior art, this application provides at least one or more of the following beneficial effects: significantly reduced discharge resistance of battery at low SOC, especially at low temperature and low SOC, reduced high-temperature gas production, cost efficiency, simple process, easy operation, and a value for wide range of mass production.

DETAILED DESCRIPTION

The secondary battery according to the present application will be described in detail below.

A first aspect of the present application provides a lithium-ion secondary battery, comprising a positive electrode plate, a negative electrode plate, an electrolyte, and a separator, wherein the positive electrode plate includes a positive electrode current collector and a first positive electrode active material layer and a second positive electrode active material layer sequentially disposed on at least one side of the positive electrode current collector; the lithium-ion secondary battery satisfies formula (I):

$$-1 \leq \log_{10}(u/v) \times w \leq 15.5 \quad \text{formula (I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$.

In formula (I), the parameters u, v, and w all represent the values when measured in the corresponding units. For example, in formula (I), the parameter u represents the value of the thickness of the first positive electrode active material layer when measured in microns; the parameter v represents the value of the thickness of the second positive electrode active material layer when measured in microns; and the parameter w represents the value of conductivity of the electrolyte at a temperature of 25° C. when measured in mS·cm$^{-1}$. Therefore, the parameters u, v, and w can all be regarded as dimensionless values in the calculation of formula (I), and the calculation result of formula (I) is also a dimensionless value.

Most of the existing methods for designing batteries and electrode plates require repeated attempts, however, such attempts need considerations on a large number of factors and have great uncertainty, which will cause a huge waste of designing costs. The inventors find through a lot of research that the material and structure of the positive electrode plate and the conductivity of the electrolyte have a certain influence on the discharge resistance of the battery at low SOC, especially the discharge resistance at low temperature and low SOC, and the performance of high-temperature gas production. Specifically, by using a combination of a specific thickness of the first positive electrode active material layer and thickness of the second positive electrode active material layer and an electrolyte with a specific conductivity, the battery has a reduced discharge resistance at a low SOC with good gas production performance.

Through a large number of experiments, the inventors summarize and propose an important relationship $\log_{10}(u/v) \times w$ related to battery design, and find that if the relationship meets the requirements of a specific value range, the resulting battery can obtain the beneficial effect of low battery discharge resistance at low SOC, especially at low temperature and low SOC. More preferably, it also has improved high-temperature gas production performance. This will greatly improve the effectiveness of battery design and save the time and cost required for research and development.

The inventors find that the parameters u, v, and w in the above formula (I) have an interrelated and inseparable influence on battery performance. By controlling the ratio of the thickness of the first positive electrode material layer to the thickness of the second positive electrode material layer, the first active material layer can provide the main capacity action, and the second positive electrode material layer can not only provide the capacity action at low SOC but also can elongate the discharge plateau of the first active material layer at low SOC, thereby reducing DCR at low SOC. Meanwhile, by combining with an electrolyte of a specific conductivity, high low-temperature performance can be achieved. Specifically, when $\log_{10}(u/v) \times w$ is in the above range, the battery has significantly better impedance performance at low SOC, especially at low temperature and low SOC, and preferably can obtain significantly better high-temperature gas production performance, thereby obtaining excellent battery performance. When $\log_{10}(u/v) \times w$ is too small, for example less than −1, the discharge resistance (DCR) of the battery at low SOC increases significantly, and even increases by more than about 20% to about 50%, and the discharge resistance at low temperature and low SOC also increases significantly. When $\log_{10}(u/v) \times w$ is too large, for example more than 16, the discharge resistance of the battery at low SOC increases significantly, and even increases by more than about 20% to about 50%, and the high-temperature gas production performance is very poor.

In some preferred embodiments, $\log_{10}(u/v) \times w$ in formula (I) is greater than or equal to 0, more preferably greater than or equal to 0.05, and even more preferably greater than or equal to 0.06. In some preferred embodiments, $\log_{10}(u/v) \times w$ in formula (I) is less than or equal to 16, more preferably less than or equal to 15.5, even more preferably less than or equal to 15. In some exemplary embodiments, the value of $\log_{10}(u/v) \times w$ may be about 5, about 7, about 9, about 12, or about 14.

In embodiments of the present application, the positive electrode plate includes a positive electrode current collector and a first positive electrode active material layer and a second positive electrode active material layer sequentially disposed on at least one side of the positive electrode current collector. For example, the positive current collector has two opposite surfaces in its own thickness direction, and the positive electrode active material layer is laminated on either or both of the two opposite surfaces of the positive current collector. During the working process, lithium ions can be reversibly deintercalated/intercalated in the positive electrode active material layer.

The first positive electrode active material in the first positive electrode active material layer has a relatively high gram capacity, so that the energy density requirement of the battery can be met. In some preferred embodiments, the first positive electrode active material layer comprises a first positive electrode active material being the compound of formula (II)

$$Li_{1+x}Ni_aCo_bM_{1-a-b}O_{2-y}A_y \quad \text{formula (II)}$$

wherein, $-0.1 \leq x \leq 0.2$, $0<a<1$, $0<b<1$, $0<a+b<1$, $0 \leq y<0.2$, M is one or more of Mn, Fe, Cr, Ti, Zn, V, Al, Zr and Ce, and A is one or more of S, F, Cl and I.

Preferably, in formula (II), $0.5 \leq a<1$, more preferably $0.7 \leq a<0.9$. Preferably, $0<b<0.5$, more preferably $0<b \leq 0.2$. Preferably, M is one or two of Mn and Al. A may preferably be one or two of S and F.

The second positive electrode active material in the second positive electrode active material layer has the characteristics of a high voltage plateau or a flat voltage plateau. With the positive electrode construction of the present application, lithium is preferentially intercalated into the surface layer of the second positive electrode active material layer during the discharge process, which can effectively shift the SOC to a high voltage and reduce the discharge resistance at available low SOC. In some preferred embodiments, the second positive electrode active material layer comprises a second positive electrode active material being a lithium-containing compound with spinel or olivine structure. More preferably, the second positive electrode active material is one or more of lithium manganate, lithium iron phosphate, lithium vanadate, and lithium nickel manganese oxide.

The inventors find that conventional ternary materials have too uniform SOC distribution with respect to voltage, and especially has a large voltage variation at available low SOC. When only conventional ternary materials are used as the positive electrode active material, the large discharge resistance leads to a decrease in the power performance of the battery at low SOC. Compared with ternary materials, lithium manganate has higher discharge plateau voltage, exhibits small capacity at low voltage, discharges at a voltage closer to the plateau area at available low SOC, and has smaller resistance. The discharge plateau voltage of lithium iron phosphate material is even lower than that of ternary materials and lithium manganate. However, under the consideration that its discharge plateau is flatter than ternary materials and lithium manganate, lithium iron phosphate material hardly provides SOC at a voltage lower than the plateau, thus has obvious advantages in discharge resistance at low SOC. The use of lithium manganate and lithium iron phosphate in the positive electrode plate can shift the SOC as a whole to a high voltage, and the SOC provided at a low voltage is reduced to a very low level, thereby reducing the DCR at low SOC. In this application, the increase effect of SOC voltage achieved by applying the second positive electrode active material on the surface of the first positive electrode active material is more significant than that achieved by directly mixing the two, and the voltage at available low SOC is closer to the plateau voltage. Compared with a single positive electrode active material or a blend of two active materials, the technical solution of the present application has a smaller voltage variation at the same discharge current and exhibits a smaller discharge resistance at low SOC.

Further, the charge and discharge voltage plateau V1 of the first positive electrode active material in the first positive electrode active material layer and the charge and discharge voltage plateau V2 of the second positive electrode active material in the second positive electrode active material layer satisfy $-1.5V \leq V1-V2 \leq 1.5V$, preferably, $-0.5V \leq V1-V2 \leq 0.5V$.

In some preferred embodiments, the ratio of the thickness u of the first positive electrode active material to the thickness v of the second positive electrode active material is $u/v \geq 1$. More preferably, $u/v \geq 8$. In some preferred embodiments, the ratio of the thickness u of the first positive electrode active material to the thickness v of the second positive electrode active material is $u/v \leq 37$, and more preferably, $u/v \leq$ about 36. In some exemplary embodiments, u/v may be 1, 5, 6, 10, 15, 18, 20, 22, 25, 28, 30, 32, 34, or 36, for example. The inventors further find that the thickness ratio u/v in the positive electrode plate has a relatively great impact on the high-temperature gas production performance of the battery. When a relatively high u/v is used, the high-temperature gas production percentage of the battery can be further reduced.

Generally, in addition to the first positive electrode active material, the first positive electrode active material layer also contains a first conductive agent and a first binder. In addition to the second positive electrode active material, the second positive electrode active material layer also contains a second conductive agent and a second binder. If needed, solvents and other additives, such as N-methylpyrrolidone (NMP) and PTC thermistor materials, may also be mixed into the positive electrode active material layer.

The conductive agent is not particularly limited as long as it exhibits conductivity and does not cause chemical changes in the battery. Suitable examples of conductive agent include, but are not limited to, graphite, such as natural graphite or artificial graphite; graphene; carbon black materials, such as carbon black, Super P, acetylene black, Ketjen black, etc.; conductive fibers, such as carbon fiber, metal fiber or carbon nanotube conductive fibers; metal powder, such as aluminum or nickel powder; conductive whiskers, such as zinc oxide, potassium titanate, etc.; conductive metal oxides, such as iron oxides; polyphenylene derivatives, etc.; and any combination thereof. In the positive electrode plate of the secondary battery, weight of the conductive agents in each layer may be independently from 0% to 4%, preferably from 1% to 3%, of total weight of the corresponding layer. For example, weight of the conductive agent in the second positive electrode active material layer may be from 0% to 4%, preferably from 1% to 3%, of total weight of the second positive electrode active material layer.

The binder is not particularly limited, as long as it provides a bonding function and does not cause chemical changes in the battery. The binder may be one or more selected from polyvinylidene fluoride-hexafluoropropylene copolymer (PVDF-co-HFP), polyvinylidene fluoride, polyacrylonitrile, polymethyl methacrylate, polyvinyl alcohol, carboxymethyl cellulose (CMC), starch, hydroxypropyl fiber, regenerated cellulose, polyvinylpyrrolidone, polytetrafluoroethylene, polyethylene, polypropylene, polyacrylic acid, styrene butadiene rubber (SBR), fluorine rubber, ethylene-vinyl acetate copolymer, polyurethanes and their copolymers. In the positive electrode plate of the secondary battery, weight of the binder in each layer may be independently from 0% to 4%, preferably from 1% to 3%, of total weight of the corresponding layer. For example, weight of the binder in the second positive electrode active material layer may be from 0% to 4%, preferably from 1% to 3%, of total weight of the second positive electrode active material layer.

Further, the resistivity ρ of the positive electrode plate satisfies: $\rho < 2500 \Omega \cdot m$. Preferably, $\rho < 1500 \Omega \cdot m$. In this application, the resistivity ρ of the positive electrode plate can be calculated according to the resistivity formula: $\rho = R \times L / s$. Specifically, R is the resistance of the positive electrode plate, L is the thickness of the active material layer on one side of the positive electrode current collector, and s is the contact area between the probe and the positive electrode plate. In the formula, the resistance R of the positive electrode plate is the resistance of the positive electrode plate measured by using DC two-probe method with contact area between the probe and the positive electrode plate of $49\pi$ mm$^2$. As an example, upper and lower sides of the positive electrode plate are clamped between two conductive terminals of electrode plate resistance tester, and a pressure is applied to fix, and then the resistance R of the positive electrode plate is measured. The diameter of the conductive terminal is 14 mm. The applied pressure is from 15 MPa to 27 MPa. The electrode plate resistance tester is, for example, Hioki BT3562 internal resistance tester.

Further, the electrolyte contains an organic solvent, a lithium salt, and an additive.

In some embodiments, the organic solvent in the electrolyte may be used without limitation, as long as it is generally used in the art. The organic solvent may be selected from one or more of conventional organic solvents such as a cyclic carbonate, a chain carbonate, and a carboxylic acid ester. Some examples of organic solvents that can be used include, but not limited to: ethylene carbonate (EC), propylene carbonate (PC), γ-butyrrolactone (GBL), butylene carbonate (BC), dimethyl carbonate (DMC), diethyl carbonate (DEC), dipropyl carbonate (DPC), propylene carbonate (EMC), methyl propyl carbonate (MPC), ethylene propyl carbonate (EPC), fluoroethylene carbonate (FEC), methyl formate (MF), ethyl formate, methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS)), diethyl sulfone (ESE), tetrahydrofuran (THF) and propylene sulfite.

Preferably, the cyclic carbonate may be selected from at least one of ethylene carbonate (EC), propylene carbonate (PC), γ-butyrolactone (GBL), and butylene carbonate (BC). Preferably, the chain carbonate may be selected from at least one of dimethyl carbonate (DMC), diethyl carbonate (DEC), dipropyl carbonate (DPC), ethyl methyl carbonate (EMC), methyl propyl carbonate (MPC) and ethylene propyl carbonate (EPC).

In some preferred embodiments, the weight ratio of cyclic carbonate to chain carbonate is in the range of from 0.22 to 0.52, preferably in the range of from 0.25 to 0.5. In some exemplary embodiments, the weight ratio of cyclic carbonate to chain carbonate is in the range of from 0.25 to 0.35, for example, 0.23, 0.25, 0.30, or 0.33.

Furthermore, the conductivity of the electrolyte at a temperature of 25° C. is in the range of from 6 mS·cm$^{-1}$ to 12 mS·cm$^{-1}$, preferably in a range of from 7.8 mS·cm$^{-1}$ to 11.5 mS·cm$^{-1}$, further preferably in a range of from 8 mS·cm$^{-1}$ to 11 mS·cm$^{-1}$. Especially preferred, the conductivity of the electrolyte at a temperature of 25° C. is in the range of from 8 mS·cm$^{-1}$ to 9.5 mS·cm$^{-1}$. In some exemplary embodiments, the conductivity of the electrolyte is 8 mS·cm$^{-1}$, 8.5 mS·$^{cm-1}$, 9.0 mS·$^{cm-1}$ or 9.5 mS·cm$^{-1}$. The conductivity of the electrolyte can be measured by a method known in the art. For example, a conductivity meter can be used to measure the conductivity of the electrolyte.

The inventors find that the conductivity of electrolyte and/or weight ratio of cyclic carbonate to chain carbonate strictly falling within the above-mentioned preferred ranges can further reduce the gas production of the battery under high temperature conditions.

In some preferred embodiments, for example, the viscosity of the electrolyte at −10° C. is 7.8 cP or lower, more preferably 7.7 cP or lower. The viscosity of the electrolyte at −10° C. is 7.7 cP or less. The inventors find that the viscosity of electrolyte at low temperature has a significant impact on the impedance of the battery at low temperature and low SOC. Controlling the viscosity of electrolyte at low temperature in an appropriate range can significantly reduce the impedance at low temperature and low SOC. The viscosity of electrolyte can be measured by a method known in the art. For example, a viscosity tester can be used to measure the viscosity of the electrolyte.

There is no specific limitation on the type of the lithium salt in electrolyte, which can be selected according to requirements. The lithium salt may be selected from at least one of inorganic lithium salt and organic lithium salt. The inorganic lithium salt may be selected from at least one of lithium hexafluorophosphate (LiPF$_6$), lithium tetrafluoroborate (LiBF$_4$), lithium hexafluoroarsenate (LiAsF$_6$), and lithium perchlorate (LiClO$_4$). The organic lithium salt may be selected from at least one of lithium bisoxalate borate (LiB(C$_2$O$_4$)$_2$, abbreviated as LiBOB), lithium bisfluorosulfonimide (LiFSI), and lithium bistrifluoromethanesulfonimide (LiTFSI). Preferably, concentration of lithium salt in the electrolyte may be from 0.5 mol/L to 1.5 mol/L, and further preferably may be from 0.8 mol/L to 1.2 mol/L.

In the electrolyte, the additives can be selected from one or more of fluorine-containing, sulfur-containing, and unsaturated double bond-containing compounds. The additives can be specifically selected from the following substances, but not limited to: fluoroethylene carbonate, ethylene sulfite, propane sultone, N-methylpyrrolidone, N-methylformamide, N-methylacetamide, acetonitrile, acrylonitrile, γ-butyrolactone, and methyl sulfide.

The above-mentioned electrolyte can be prepared according to conventional methods in the art. The organic solvent and the electrolyte lithium salt and optional additives can be mixed uniformly to obtain an electrolyte. The order for adding materials is not particularly limited. In an example, the electrolytic lithium salt and optional additives are added to organic solvent and mixed uniformly to obtain the electrolyte. In this example, the electrolytic lithium salt may be added to the organic solvent first, followed by addition of optional additives to the organic solvent separately or at the same time.

In this application, type and composition of the separator are not particularly limited, and can be selected according to actual needs. Specifically, the separator may be selected from polyethylene film, polypropylene film, polyvinylidene fluoride film and a multilayer composite film thereof.

A second aspect of the present application refers to a method for preparing a lithium-ion secondary battery, at least including the following steps:

S1, applying a positive electrode slurry including a first positive electrode active material, a conductive agent and a binder on at least one surface of a positive electrode current collector, to form a first positive electrode active material layer;

S2, applying a positive electrode slurry containing a second positive electrode active material, a conductive agent and the binder on the first positive electrode active material layer, to form a second positive electrode active material layer;

S3, drying to obtain a positive electrode plate including the positive electrode current collector and the first positive electrode active material layer and the second positive electrode active material layer sequentially disposed on at least one side of the positive electrode current collector;

S4, sequentially laminating the positive electrode plate, a separator and a negative electrode plate and then winding or pressing to obtain an electrode assembly, then injecting an electrolyte, and packaging, to obtain a secondary battery;

wherein, the lithium-ion secondary battery satisfies formula (I):

$$-1 \leq \log_{10}(u/v) \times w \leq 15.5 \quad \text{formula (I)}$$

wherein, u is a thickness of the first positive electrode active material layer in microns, v is a thickness of the second positive electrode active material layer in microns, w is a conductivity of the electrolyte at a temperature of 25° C. in mS·cm$^{-1}$.

All of the above-described preferred solutions and preferred parameters for lithium-ion secondary batteries can be independently applied to the method for preparing lithium-ion secondary batteries. For brevity, they are not repeated here.

In a particular embodiment of the present application, the battery is a lithium-ion battery.

The electrode assembly is accommodated in the housing. The number of electrode assemblies is not limited, and may be one or more. The electrode assembly includes a positive electrode plate, a negative electrode plate, and a separator. The separator separates the positive electrode plate and the negative electrode plate. The electrolyte is injected into the housing and impregnates the electrode assembly, which includes for example a first electrode plate, a second electrode plate, and a separator.

It is noted that the lithium-ion battery is for example a can type battery, but is not limited to this. The lithium ion battery may be a pouch type battery, in which the casing is replaced by a metal plastic film and the top cover assembly is eliminated.

Next, the battery module of another aspect of the present application will be illustrated.

In an embodiment of a battery module, the battery module provided by embodiments of the present application comprises the lithium-ion battery of the present application.

In the embodiment, the battery module includes a plurality of batteries. A plurality of lithium ion batteries are arranged in the longitudinal direction. The battery module can be used as a power source or an energy storage device. The number of the lithium-ion batteries in the battery module may be adjusted according to the application and capacity of the battery module.

Next, the battery pack of another aspect of the present application will be illustrated.

In an embodiment of a battery pack, the battery pack provided by the present application comprises the battery module according to an embodiment of the present application.

In particular, in the embodiment of battery pack, the battery pack comprises an upper case body and a lower case body and the battery modules. The upper case body and the lower case body are assembled together to form a space for accommodating the battery module. The battery module is placed in the space formed by assembling the upper case body and the lower case body together. The output electrode of the battery module passes through one of or between the upper case body and the lower case body, to supply power to the outside or charge from the outside. The number and arrangement of the battery modules used in the battery pack can be determined according to actual needs.

Next, the apparatus of another aspect of the present application will be illustrated.

The apparatus provided by the present application comprises the lithium-ion battery according to an embodiment of the present application, wherein the lithium-ion battery may be used as a power source or an energy storage unit for the apparatus. In an embodiment of an apparatus in which a lithium-ion battery is used as a power source, the apparatus using the lithium-ion battery is an electric vehicle. Certainly, the apparatus is not limited to this. The apparatus using the lithium-ion battery can also be any electric vehicle other than electric vehicles (such as electric buses, electric trams, electric bicycles, electric motorcycles, electric scooters, electric golf carts, electric trucks), electric ships, electric tools, electronic devices and energy storage systems. The electric vehicle may be a pure electric vehicle, a hybrid electric vehicle, or a plug-in hybrid electric vehicle. Certainly, according to the actual use form, the apparatus provided in this application may include the battery module described in this application, and certainly, the apparatus provided in this application may also include the battery pack described in this application.

Some exemplary embodiments of the present invention are provided as follows.

Embodiment 1. A lithium-ion secondary battery, comprising a positive electrode plate, a negative electrode plate, an electrolyte and a separator, wherein the positive electrode plate comprises a positive electrode current collector and a first positive electrode active material layer and a second positive electrode active material layer sequentially disposed on at least one side of the positive electrode current collector; the lithium-ion secondary battery satisfies formula (I):

$$-1 \leq \log_{10}(u/v) \times w \leq 15.5 \quad \text{formula (I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$.

Embodiment 2. The lithium-ion secondary battery according to Embodiment 1, wherein the first positive electrode active material layer comprises a first positive electrode active material being the compound of formula (II), $$Li_{1+x}Ni_aCo_bM_{1-a-b}O_{2-y}A_y \quad \text{formula (II)}$$

wherein, −0.1≤x≤0.2, 0<a<1, 0<b<1, 0<a+b<1, 0≤y<0.2, M is one or more of Mn, Fe, Cr, Ti, Zn, V, Al, Zr and Ce, and A is one or more of S, F, Cl and I.

Embodiment 3. The lithium-ion secondary battery according to Embodiment 1 or 2, wherein the second positive electrode active material layer comprises a second positive electrode active material, and the second positive electrode active material is a lithium-containing compound with spinel or olivine structure, preferably, the second positive electrode active material is one or more of lithium manganate, lithium iron phosphate, lithium vanadate and lithium nickel manganese oxide.

Embodiment 4. The lithium-ion secondary battery according to any one of Embodiments 1 to 3, wherein a charge and discharge voltage plateau V1 of the first positive electrode active material in the first positive electrode active material layer and a charge and discharge voltage plateau V2 of the second positive electrode active material in the second positive electrode active material layer satisfy −1.5V≤V1−V2≤1.5V, preferably, −0.5V≤V1−V2≤0.5V.

Embodiment 5. The lithium-ion secondary battery according to any one of Embodiments 1-4, wherein the resistivity p of the positive electrode plate satisfies: ρ≤2500Ω·m, preferably, ρ≤1500Ω·m.

Embodiment 6. The lithium-ion secondary battery according to any one of Embodiments 1 to 5, wherein ratio of the thickness u of the first positive electrode active material to the thickness v of the second positive electrode active material is u/v≥1, and more preferably, u/v≥8.

Embodiment 7. The lithium-ion secondary battery according to any one of Embodiments 1 to 6, wherein the conductivity w of the electrolyte at a temperature of 25° C. is in a range of from 6 mS·cm$^{-1}$ to 11 mS·cm$^{-1}$, preferably in a range of from 7 mS·cm$^{-1}$ to 10 mS·cm$^{-1}$.

Embodiment 8. The lithium-ion secondary battery according to any one of Embodiments 1-7, wherein the solvent in the electrolyte contains a cyclic carbonate and a chain carbonate, and weight ratio of the cyclic carbonate to the chain carbonate is in a range of from 0.22 to 0.52, preferably in a range of from 0.25 to 0.5.

Embodiment 9. The lithium-ion secondary battery according to any one of Embodiments 1 to 8, wherein viscosity of the electrolyte at −10° C. is 7.8 cP or lower.

Embodiment 10. A method for preparing a lithium-ion secondary battery, at least comprising following steps:
S1, applying a positive electrode slurry comprising a first positive electrode active material, a conductive agent and a binder on at least one surface of a positive electrode current collector, to form a first positive electrode active material layer;

S2, applying a positive electrode slurry comprising a second positive electrode active material, a conductive agent and the binder on the first positive electrode active material layer, to form a second positive electrode active material layer;

S3, drying to obtain a positive electrode plate comprising the positive electrode current collector and the first positive electrode active material layer and the second positive electrode active material layer sequentially disposed on at least one side of the positive electrode current collector;

S4, sequentially laminating the positive electrode plate, a separator and a negative electrode plate and then winding or pressing to obtain an electrode assembly, then injecting an electrolyte, and packaging, to obtain a secondary battery;

wherein, the lithium-ion secondary battery satisfies formula (I):

$$-1 \leq \log_{10}(u/v) \times w \leq 15.5 \qquad \text{formula (I)}$$

wherein, u is a thickness of the first positive electrode active material layer in microns, v is a thickness of the second positive electrode active material layer in microns, w is a conductivity of the electrolyte at a temperature of 25° C. in mS·cm$^{-1}$.

Embodiment 11. A battery module comprising the lithium-ion secondary battery according to any one of Embodiments 1 to 9.

Embodiment 12. A battery pack comprising the battery module according to Embodiment 11.

Embodiment 13. Apparatus, comprising the lithium-ion secondary battery according to any one of Embodiments 1-9, wherein the lithium-ion secondary battery is used as power source or energy storage unit of the apparatus; preferably, the apparatus comprises electric vehicles, hybrid electric vehicles, plug-in hybrid electric vehicles, electric bicycles, electric scooters, electric golf carts, electric trucks, electric ships, and energy storage systems.

EXAMPLES

In order to make the object, technical solution, and technical effects of the present application apparent, the following further describes the present application in detail with reference to the embodiments. However, it should be understood that the embodiments described in the present application are only for explaining the present application, and are not intended to limit the application. Conventional conditions or the conditions recommended by material suppliers or equipment suppliers are used when experimental conditions are not stated in the examples.

Example 1

Preparation of Positive Electrode Plate

Ternary material $LiNi_{0.8}Co_{0.1}Mn_{0.1}O_2$, a conductive carbon black and a binder (PVDF) were mixed in a weight ratio of 96:2:2, uniformly stirred in N-methylpyrrolidone (NMP), and applied on the aluminum foil as current collector, to form the first positive electrode active material layer. Lithium vanadate $LiVO_3$, a conductive carbon black and a binder (PVDF) were mixed in a weight ratio of 96:2:2, uniformly stirred in NMP, and applied on the first positive electrode active material layer, to form the second positive electrode active material layer. After drying, cold pressing, slitting, and cutting, a positive electrode plate was obtained. The weight ratio of the first positive electrode active material to the second positive electrode active material was 7:3.

Preparation of Negative Electrode Plate

Graphite as the negative electrode active material, a conductive agent (super P), a thickener (carboxymethyl cellulose, CMC) and a binder (styrene butadiene rubber) were mixed in a weight ratio of 96:1:1:2, dispersed in solvent (deionized water) and mixed evenly, to obtain a negative electrode slurry. The negative electrode slurry was evenly applied on copper foil as a negative electrode current collector. The negative electrode current collector coated with negative slurry was dried, cold pressed, slitted and cut, to obtain the negative electrode plate.

Preparation of Electrolyte

Ethylene carbonate, ethyl methyl carbonate and dimethyl carbonate were mixed uniformly in a volume ratio of 20:20:60 to obtain an organic solvent. In an argon atmosphere glove box with a water content of less than 10 ppm, 1 mol/L $LiPF_6$ was dissolve in the above-mentioned organic solvent and mixed homogeneously to obtain an electrolyte.

Separator

A polyethylene film with a thickness of 12 μm was used as the separator.

Preparation of Lithium-Ion Secondary Battery

The positive electrode plate, the separator, and the negative electrode plate were sequentially laminated in sequence. A polyethylene (PE) film with a thickness of 14 μm was used as the separator, and placed between the positive electrode plate and the negative electrode plate for separation. They were then wound into a cuboid electrode assembly. After having tabs welded on, the electrode assembly was placed into an aluminum foil housing, baked at 80° C. to remove water. After injecting electrolyte, sealing, standing, heat and cold pressing, and formation (charging at a constant current of 0.02 C to 3.3V, then charging at a constant current of 0.1 C to 3.6V), shaping, capacity testing and other procedures, a soft-package lithium-ion secondary battery with a thickness of 4.0 mm, a width of 60 mm and a length of 140 mm was obtained.

Tables 1 to 2 list the coating thickness, conductivity of electrolyte, cyclic carbonate, chain carbonate and other parameters of the secondary battery of Example 1.

Examples 2-8

Example 1 was repeated, except that the first positive electrode active material, the second positive electrode active material, the thickness values of layers, and/or the conductivity of the electrolyte were adjusted, respectively. The detailed parameters were listed in Table 1.

Comparative Example 1

Different from Example 1, a second positive electrode active material layer was not contained in Comparative Example 1.

Comparative Example 2

Difference from Example 1, in Comparative Example 2, the first positive electrode active material and the second positive electrode active material were mixed at a weight ratio of 7:3, and only one active material layer was disposed.

Comparative Example 3-4

Example 1 was repeated, except that the coating thickness and the conductivity of electrolyte were adjusted. The detailed parameters were listed in Tables 1 and 2.

Test Methods:

(1) Direct Current Impedance Test of Lithium-Ion Secondary Battery

At 25° C., a fresh lithium-ion secondary battery was left for 5 minutes, charged at a constant current of 1 C to 4.2V, and then charged at a constant voltage until the current was less than or equal to 0.05 C. At this time, the state of charge (SOC) of the battery was 100%. Then, the battery was left for 5 minutes, and then discharged at a constant current rate of 1 C, so that the state of charge (SOC) of the lithium-ion secondary batteries was adjusted to 10%.

The lithium-ion secondary battery with 10% SOC was left at 25° C. for 10 minutes and discharged at a constant current of 4 C for 30 seconds. The voltage U1 at the last one second of being left, the voltage U2 at the last one second of being discharged at a constant current of 4 C, and the current I for being discharged at a constant current of 4 C were recorded.

Direct current impedance of the lithium-ion secondary battery with 10% SOC discharged at a constant current of 4 C for 30 seconds at 25° C.=(U2−U1)/I.

Different from the direct current impedance test of lithium-ion secondary battery with 10% discharged at 4 C for 30 seconds at 25° C., the direct current impedance test of lithium-ion secondary battery with 10% discharged at 4 C for 30 seconds at −10° C. was carried out at a discharge temperature of −10° C.

(2) Gas Production Performance Test for Lithium-Ion Secondary Battery Under High-Temperature Storage At 25° C., the fresh lithium-ion secondary battery was left for 5 minutes, charged at a constant current of 1 C to 4.2V, and then charged at a constant voltage until the current was less than or equal to 0.05 C. At this time, the state of charge (SOC) of the battery was 100%. A vernier caliper was used to measure the thickness T1 of the battery.

The fully charged battery was placed in an oven at 60° C., taken out after storage for 30 days. The thickness T2 of the battery was tested.

The percentage of gas production of lithium-ion secondary battery with 100% SOC stored at 60° C. for 30 days= (T2−T1)/T1*100%.

(3) Test of the Thickness u of the First Active Material Layer and the Thickness v of the Second Active Material Layer A scanning electron microscope SEM method was used to measure cross section of positive electrode plate. The thickness of the first positive electrode active material layer and the second positive electrode active material layer was measured for 10 regions, and the average value was calculated.

(4) Test of Resistivity ρ of Positive Electrode Plate

The resistivity was calculated according to the resistivity formula: $\rho = R \times L/s$. In the formula, R was resistance of the positive electrode plate, L is total thickness of the active material layer on one side of the positive electrode current collector, and s is contact area between probe and the positive electrode plate.

Hioki BT3562 internal resistance tester was used for measuring the resistance R of the positive electrode plate, including: clamping the positive electrode plate between two conductive terminals of the internal resistance tester, applying pressure to fix it, and testing the resistance R of the positive electrode plate. The diameter of the conductive terminal was 14 mm, the applied pressure was from 15 MPa to 27 MPa, and the range of sampling time was from 5 s to 17 s.

(5) Test of Conductivity w of Electrolyte at a Temperature of 25° C.

A conductivity meter DDSJ-318 was used, under the conditions of 25° C. and alternating-current impedance of 1 kHz. The resistance of the electrolyte was tested. The conductivity w of the electrolyte was calculated.

(6) Test of Viscosity of Electrolyte at −10° C.

The test was carried out by using Brookfield DV2T-LV viscosity tester with a suitable range.

TABLE 1

| Nos. | First positive electrode active material layer | | | Second positive electrode active material layer | | | Resistivity ρ of positive electrode plate $\Omega \cdot m$ |
|---|---|---|---|---|---|---|---|
| | Substances | Charge and discharge plateau V1 V | Thickness u μm | Substances | Charge and discharge plateau V2 V | Thickness v μm | |
| Example 1 | $LiNi_{0.8}Co_{0.1}Mn_{0.1}O_2$ | 3.67 | 89 | $LiVO_3$ | 2.5 | 10 | 600 |
| Example 2 | $LiNi_{0.8}Co_{0.1}Mn_{0.1}O_2$ | 3.67 | 89 | $LiNi_{0.5}Mn_{1.5}O_4$ | 4.7 | 10 | 500 |
| Example 3 | $LiNi_{0.8}Co_{0.1}Mn_{0.1}O_2$ | 3.67 | 51 | $LiNi_{0.5}Mn_{1.5}O_4$ | 4.7 | 50 | 900 |
| Example 4 | $LiNi_{0.8}Co_{0.1}Mn_{0.1}O_2$ | 3.67 | 89 | $LiNi_{0.5}Mn_{1.5}O_4$ | 4.7 | 11 | 500 |
| Example 5 | $LiNi_{0.8}Co_{0.1}Mn_{0.1}O_2$ | 3.67 | 109 | $LiNi_{0.5}Mn_{1.5}O_4$ | 4.7 | 3 | 400 |
| Example 6 | $LiNi_{0.8}Co_{0.1}Mn_{0.1}O_2$ | 3.67 | 89 | $LiFePO_4$ | 3.2 | 10 | 1500 |
| Example 7 | $LiNi_{0.8}Co_{0.1}Mn_{0.1}O_2$ | 3.67 | 89 | $LiMn_2O_4$ | 3.95 | 10 | 600 |
| Example 8 | $LiNi_{0.8}Co_{0.1}Mn_{0.1}O_2$ | 3.67 | 80 | $LiFePO_4$ | 3.2 | 79 | 2500 |
| Comparative example 1 | $LiNi_{0.8}Co_{0.1}Mn_{0.1}O_2$ | 3.67 | 89 | / | / | / | 400 |
| Comparative example 2 | $LiNi_{0.8}Co_{0.1}Mn_{0.1}O_2$ + 30% $LiVO_3$ | 3.67/2.5 | 99 | / | / | / | / |
| Comparative example 3 | $LiNi_{0.8}Co_{0.1}Mn_{0.1}O_2$ | 3.67 | 109 | $LiMn_2O_4$ | 3.95 | 5 | 500 |
| Comparative | $LiNi_{0.8}Co_{0.1}Mn_{0.1}O_2$ | 3.67 | 51 | $LiMn_2O_4$ | 3.95 | 89 | 1500 |

TABLE 1-continued

| | First positive electrode active material layer | | | Second positive electrode active material layer | | | Resistivity ρ |
|---|---|---|---|---|---|---|---|
| Nos. | Substances | Charge and discharge plateau V1 V | Thickness u μm | Substances | Charge and discharge plateau V2 V | Thickness v μm | of positive electrode plate Ω·m |
| example 4 | | | | | | | |

TABLE 2

| Nos. | Conductivity w mS·cm$^{-1}$ | Viscosity (−10° C.) cP | Mass ratio of cyclic carbonate/chain carbonate |
|---|---|---|---|
| Example 1 | 8 | 7.7 | 0.25 |
| Example 2 | 9.5 | 6.91 | 0.33 |
| Example 3 | 11 | 6.67 | 0.51 |
| Example 4 | 7.8 | 7.81 | 0.23 |
| Example 5 | 9.5 | 6.91 | 0.33 |
| Example 6 | 8 | 7.7 | 0.25 |
| Example 7 | 8 | 7.7 | 0.25 |
| Example 8 | 8 | 7.7 | 0.25 |
| Comparative example 1 | 8 | 7.7 | 0.25 |
| Comparative Example 2 | 8 | 7.7 | 0.25 |
| Comparative Example 3 | 12 | 6.23 | 0.55 |
| Comparative Example 4 | 7.5 | 7.85 | 0.2 |

Performance of electrode assembly of each example was tested. The results were listed in Table 3.

TABLE 3

| Examples Nos. | $\log_{10}(u/v) \times w$ | DCR at 25° C., 20% SOC mΩ | DCR at 25° C., 90% SOC mΩ | DCR at −10° C. mΩ | Gas production percentage at 60° C. |
|---|---|---|---|---|---|
| Example 1 | 7.6 | 27.3 | 24.5 | 281.9 | 16.1% |
| Example 2 | 9.0 | 26.9 | 23.0 | 271.3 | 20.1% |
| Example 3 | 0.1 | 28.7 | 22.7 | 284.5 | 23.5% |
| Example 4 | 7.1 | 27.1 | 23.4 | 279.6 | 14.9% |
| Example 5 | 14.8 | 29.2 | 23.1 | 287.2 | 19.8% |
| Example 6 | 7.6 | 30.1 | 24.6 | 293.2 | 15.8% |
| Example 7 | 7.6 | 25.4 | 24.8 | 269.8 | 15.6% |
| Example 8 | 0.0 | 31.2 | 25.4 | 312.4 | 18.7% |
| Comparative example 1 | / | 35.3 | 24.9 | 360.3 | 35.4% |
| Comparative Example 2 | / | 32.1 | 26.3 | 327.1 | 14.7% |
| Comparative example 3 | 16.1 | 33.6 | 22.6 | 254.1 | 27.1% |
| Comparative example 4 | −1.8 | 34.9 | 25.1 | 330.7 | 13.7% |

It can be seen from Table 1 and Table 2 that when the two layers of active materials applied in sequence and the $\log_{10}(u/v) \times w$ in specific range in this application were adopted, the secondary battery exhibited a smaller discharge resistance at low SOC under normal temperature conditions and low temperature conditions, meanwhile having a lower high-temperature gas production. In particular, the discharge resistance at low SOC obtained in Example 7 was significantly lower, meanwhile maintaining a very low high-temperature gas production.

In Comparative Example 3 with $\log_{10}(u/v) \times w$ of greater than 16, when the thickness ratio of the first positive electrode active material layer with a higher working voltage to the second positive electrode active material layer with a lower working voltage was too large, interface impedance of the positive electrode plate at low SOC increased too fast, and the ion transport performance of the electrolyte was still not enough to improve the overall direct current impedance of the battery, even if the conductivity of the electrolyte was high, resulting in a significant increase in the discharge resistance of the battery at low SOC and more side reactions on surface of electrode plate and very poor high-temperature gas production performance. In Comparative Example 4 with $\log_{10}(u/v) \times w$ as low as −1.80, when the thickness ratio of the first positive electrode active material layer with a higher working voltage to the second positive electrode active material layer with a lower working voltage was relatively low and the conductivity of electrolyte was relatively lower, the gas product problem of the battery was improved, however, the ion transport performance of the electrolyte was low, which cannot effectively improve the discharge resistance (DCR) of the battery at low SOC at room temperature and low temperature. Meanwhile, the volumetric energy density of the battery was also caused to decrease significantly.

For the sake of brevity, only some numerical ranges are explicitly disclosed herein. However, any lower limit may be combined with any upper limit to form a range that is not explicitly described; and any lower limit may be combined with other lower limit to form an unspecified range; and any upper limit may be combined with any other upper limit to form an unspecified range. Further, although not explicitly specified, each point or single value between the endpoints of a range is included in the range. Thus, each point or single value can be combined with any other point or single value or combined with other lower or upper limits to form a range that is not explicitly specified.

Based on the disclosure and teaching of the foregoing specification, those skilled in the art to which this application belongs can also make appropriate changes and modifications to the foregoing embodiments. Therefore, the present application is not limited to the specific embodiments disclosed and described above, and some modifications and changes to the present application should also fall within the protection scope of the claims of the present application. Moreover, those skilled in the art can understand that this application also discloses various embodiments of the positive electrode plate as described above. In addition, although some specific terms are used in the present specification, these terms are only for convenience of description and do not constitute any limitation to the present application.

What is claimed is:

1. A lithium-ion secondary battery, comprising a positive electrode plate, a negative electrode plate, an electrolyte and a separator, wherein the positive electrode plate comprises a positive electrode current collector and a first positive electrode active material layer and a second positive electrode active material layer sequentially disposed on at least one side of the positive electrode current collector; the lithium-ion secondary battery satisfies formula (I):

$$0.05 \leq \log_{10}(u/v) \times w \leq 15.5 \quad \text{formula(I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$,
wherein the first positive electrode active material layer comprises a first positive electrode active material being the compound of formula (II), $$Li_{1+x}Ni_aCo_bM_{1-a-b}O_{2-y}A_y \qquad \text{formula (II)}$$

wherein, $-0.1 \leq x \leq 0.2$, $0.7 \leq a < 1$, $0 b < 1$, $0 < a+b < 1$, $0 \leq y < 0.2$, M is one or more of Mn, Fe, Cr, Ti, Zn, V, Al, Zr and Ce, and A is one or more of S, F, Cl and I, and the second positive electrode active material layer comprises a second positive electrode active material, and the second positive electrode active material is one or more of lithium manganate, lithium iron phosphate, lithium vanadate and lithium nickel manganese oxide and wherein ratio of the thickness u of the first positive electrode active material to the thickness v of the second positive electrode active material is $u/v \geq 5$.

2. The lithium-ion secondary battery according to claim 1, wherein the second positive electrode active material is a lithium-containing compound with spinel or olivine structure.

3. The lithium-ion secondary battery according to claim 1, wherein the resistivity p of the positive electrode plate satisfies: $\rho \leq 2500\Omega\cdot m$.

4. The lithium-ion secondary battery according to claim 1, wherein the conductivity w of the electrolyte at a temperature of 25° C. is in a range of from 6 mS·$^{cm-1}$ to 11 mS·cm$^{-1}$.

5. The lithium-ion secondary battery according to claim 1, wherein the solvent in the electrolyte contains a cyclic carbonate and a chain carbonate, and weight ratio of the cyclic carbonate to the chain carbonate is in a range of from 0.22 to 0.52.

6. The lithium-ion secondary battery according to claim 5, wherein the solvent in the electrolyte contains a cyclic carbonate and a chain carbonate, and weight ratio of the cyclic carbonate to the chain carbonate is in a range of from 0.25 to 0.5.

7. The lithium-ion secondary battery according to claim 1, wherein viscosity of the electrolyte at $-10°$ C. is 7.8 cP or lower.

8. The lithium-ion secondary battery according to claim 1, wherein the resistivity p of the positive electrode plate satisfies: $\rho \leq 1500\Omega\cdot m$.

9. The lithium-ion secondary battery according to claim 1, wherein ratio of the thickness u of the first positive electrode active material to the thickness v of the second positive electrode active material is $u/v \geq 8$.

10. The lithium-ion secondary battery according to claim 1, wherein the conductivity w of the electrolyte at a temperature of 25° C. is in a range of from 7 mS·cm$^{-1}$ to 10 mS·cm$^{-1}$.

11. A battery module comprising the lithium-ion secondary battery according to claim 1.

12. A battery pack comprising the battery module according to claim 11.

13. Apparatus, comprising the lithium-ion secondary battery according to claim 1, wherein the lithium-ion secondary battery is used as power source or energy storage unit of the apparatus.

14. The apparatus according to claim 13, wherein the apparatus comprises electric vehicles, hybrid electric vehicles, plug-in hybrid electric vehicles, electric bicycles, electric scooters, electric golf carts, electric trucks, electric ships, and energy storage systems.

15. A method for preparing a lithium-ion secondary battery, at least comprising following steps:
S1, applying a positive electrode slurry comprising a first positive electrode active material, a conductive agent and a binder on at least one surface of a positive electrode current collector, to form a first positive electrode active material layer;
S2, applying a positive electrode slurry comprising a second positive electrode active material, a conductive agent and the binder on the first positive electrode active material layer, to form a second positive electrode active material layer;
S3, drying to obtain a positive electrode plate comprising the positive electrode current collector and the first positive electrode active material layer and the second positive electrode active material layer sequentially disposed on at least one side of the positive electrode current collector;
S4, sequentially laminating the positive electrode plate, a separator and a negative electrode plate and then winding or pressing to obtain an electrode assembly, then injecting an electrolyte, and packaging, to obtain a secondary battery;
wherein, the lithium-ion secondary battery satisfies formula (I):

$$0.05 \leq \log_{10}(u/v) \times w \leq 15.5 \qquad \text{formula (I)}$$

wherein,
u is a thickness of the first positive electrode active material layer in microns,
v is a thickness of the second positive electrode active material layer in microns,
w is a conductivity of the electrolyte at a temperature of 25° C. in mS·cm$^{-1}$, and
wherein the first positive electrode active material layer comprises a first positive electrode active material being the compound of formula (II), $$Li_{1+x}Ni_aCo_bM_{1-a-b}O_{2-y}A_y \qquad \text{formula (II)}$$

wherein, $-0.1 \leq x \leq 0.2$, $0.7 \leq a < 1$, $0 < b < 1$, $0 < a+b < 1$, $0 \leq y < 0.2$, M is one or more of Mn, Fe, Cr, Ti, Zn, V, Al, Zr and Ce, and A is one or more of S, F, Cl and I, and
the second positive electrode active material is one or more of lithium manganate, lithium iron phosphate, lithium vanadate and lithium nickel manganese oxide, and wherein ratio of the thickness u of the first positive electrode active material to the thickness v of the second positive electrode active material is $u/v \geq 5$.

* * * * *